(12) United States Patent
Ishizuka

(10) Patent No.: US 7,391,521 B2
(45) Date of Patent: Jun. 24, 2008

(54) POSITION DETECTION APPARATUS AND METHOD

(75) Inventor: Ko Ishizuka, Saitama (JP)

(73) Assignee: Canon Kabushiki Kaisha, Tokyo (JP)

(*) Notice: Subject to any disclaimer, the term of this patent is extended or adjusted under 35 U.S.C. 154(b) by 264 days.

(21) Appl. No.: 11/250,667

(22) Filed: Oct. 13, 2005

(65) Prior Publication Data

US 2006/0082783 A1    Apr. 20, 2006

(30) Foreign Application Priority Data

Oct. 15, 2004    (JP) .............................. 2004-302063

(51) Int. Cl.
*G01B 9/02* (2006.01)
*G01B 11/02* (2006.01)

(52) U.S. Cl. ........................................ 356/493; 356/498

(58) Field of Classification Search ................ 356/498, 356/487, 488, 493, 494, 499, 508–510, 496, 356/505, 511

See application file for complete search history.

(56) References Cited

U.S. PATENT DOCUMENTS

| | | | | |
|---|---|---|---|---|
| 3,938,889 A | * | 2/1976 | McKinnis | 356/458 |
| 5,341,213 A | * | 8/1994 | Giroux | 356/509 |
| 5,418,612 A | | 5/1995 | Khopov | 356/360 |
| 5,469,259 A | | 11/1995 | Golby et al. | 356/351 |
| 5,815,267 A | * | 9/1998 | Kato et al. | 356/486 |
| 5,995,222 A | * | 11/1999 | Kanaya et al. | 356/508 |
| 6,313,918 B1 | * | 11/2001 | Hill et al. | 356/493 |
| 6,469,790 B1 | | 10/2002 | Manning | |
| 6,762,845 B2 | * | 7/2004 | Hill | 356/520 |
| 6,778,280 B2 | * | 8/2004 | De Groot et al. | 356/493 |
| 6,885,460 B2 | * | 4/2005 | Morita | 356/514 |
| 6,956,655 B2 | * | 10/2005 | Hill | 356/498 |

(Continued)

FOREIGN PATENT DOCUMENTS

| | | |
|---|---|---|
| JP | 05-079816 | 3/1993 |
| JP | 08-505952 | 6/1996 |
| JP | 2001-076325 | 3/2001 |

OTHER PUBLICATIONS

Patent Abstracts of Japan English Abstract for JP 05 079816.

(Continued)

*Primary Examiner*—Patrick Connolly
*Assistant Examiner*—Scott M Richey
(74) *Attorney, Agent, or Firm*—Morgan & Finnegan LLP

(57) ABSTRACT

Position detection apparatus comprises: an incident unit that forms a parallel beam from a light beam of a light source and supplies the parallel beam to a beam splitter in a way that the separated beams, obtained from the parallel beam by the beam splitter, are respectively incident upon the reference surface and the measurement target surface at an angle; and a reflection unit that reflects the separated beams, which have been reflected by the reference surface and the measurement target surface and integrated to a light path by the beam splitter, to be supplied to the beam splitter as a parallel beam along the light path, and generates a signal corresponding to a phase difference of the separated beams by interfering a light beam that has been supplied from the reflection unit, separated by the beam splitter, reflected by the reference surface and the measurement target surface, and integrated again to a light path by the beam splitter.

11 Claims, 8 Drawing Sheets

U.S. PATENT DOCUMENTS

| | | | | |
|---|---|---|---|---|
| 7,298,493 | B2 * | 11/2007 | Ranalli | 356/493 |
| 2001/0006420 | A1 * | 7/2001 | Kato | 356/498 |
| 2004/0042014 | A1 * | 3/2004 | Feldman | 356/484 |
| 2006/0033931 | A1 * | 2/2006 | Lau et al. | 356/493 |

OTHER PUBLICATIONS

European Search Report, dated Jan. 17, 2006, for corresponding European Patent Appln 05 021142.4.

2005101136743 (No English Translation).

An Office Communication from the Korean Patent Office dated Nov. 30, 2007 for Korean Patent Appl. No. 10-2005-0096983, which claims priority to Japanese Appl. No. 2004-00302063.

Patent Abstracts of Japan English Abstracts for JP 05 079816.

European Search Report, dated Jan. 17, 2006, for corresponding European Patent Appln 05 021142.4.

* cited by examiner

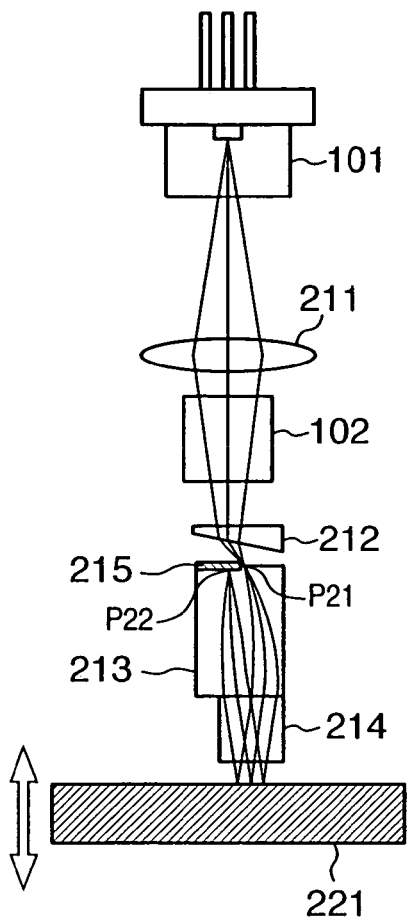 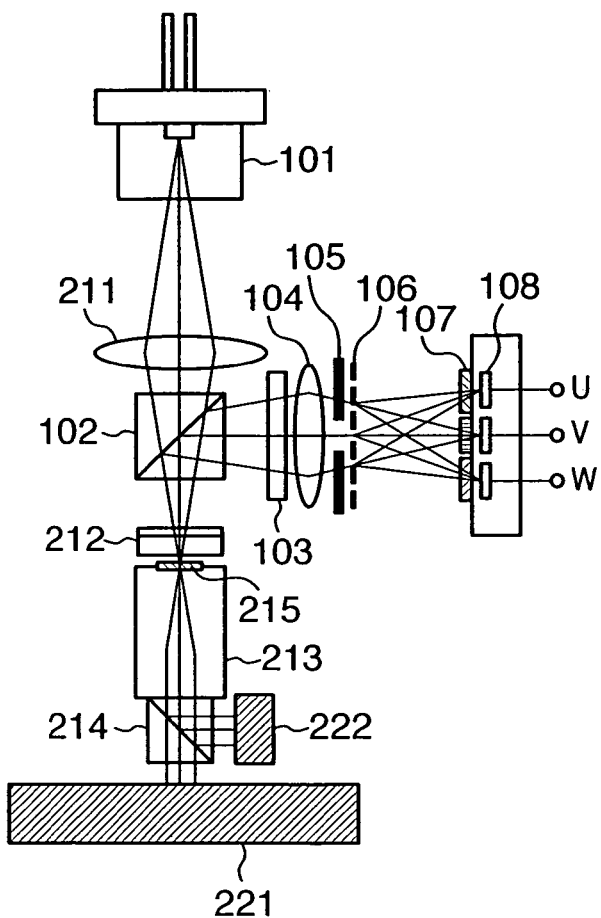
F I G. 4A  F I G. 4B

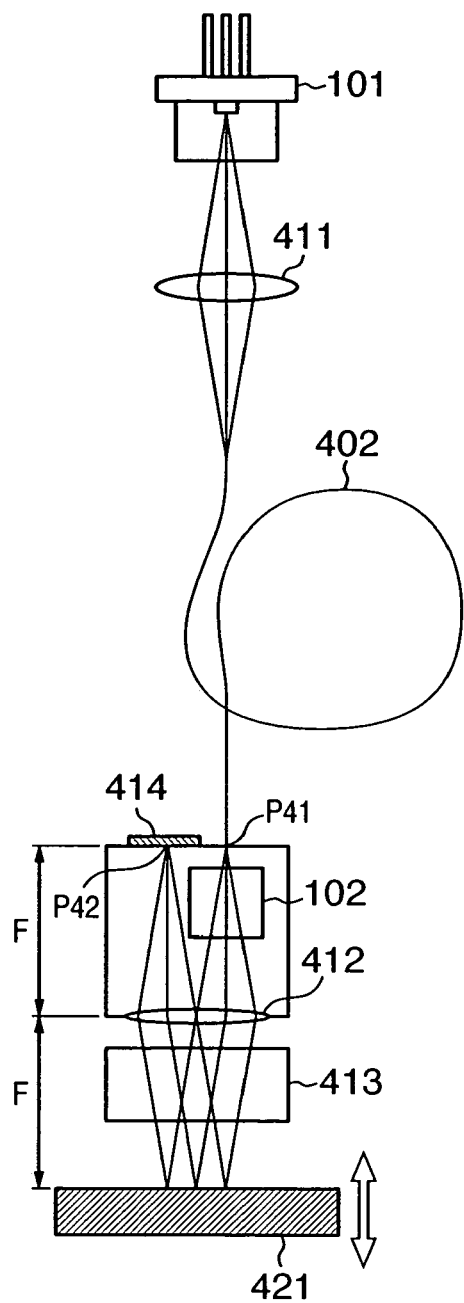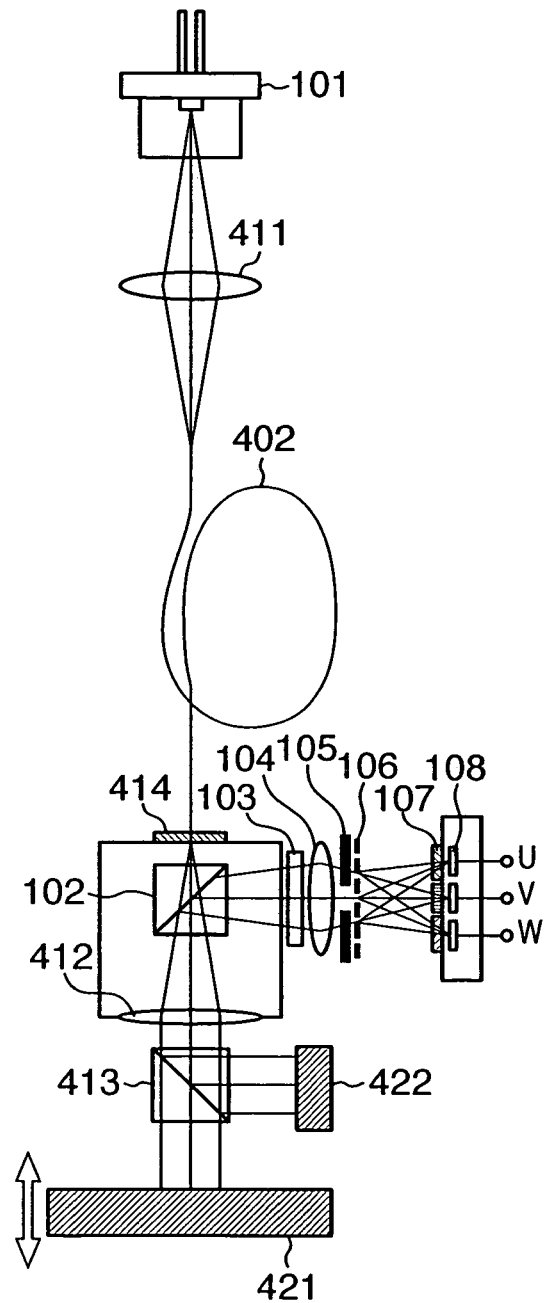
F I G. 6A    F I G. 6B

POSITION DETECTION APPARATUS AND METHOD

FIELD OF THE INVENTION

The present invention relates to a position detection apparatus and method for detecting an object's position variation without a contact by utilizing interference measurement.

BACKGROUND OF THE INVENTION

The Michelson interferometer employing a laser is widely utilized in the field that requires nanometer measurement. An interferometer of this type needs to receive reflected light from a measurement-target object. For this purpose, mirrors are generally used. In the method utilizing mirrors, since optical alignment must be adjusted with extremely high precision, normally a cube corner reflector is employed for the measurement target so that interference measurement is not interrupted by deviation of the optical alignment. However, because a cube corner reflector is a prism, it cannot be attached to a microscopic location. In other words, if the measurement-target object is microscopic, position measurement employing an interferometer cannot be performed.

In view of this, the applicant of this invention has proposed to focus light on a mirror serving as the measurement target as shown in FIG. 8 so as to prevent a disturbance of the interference state caused by deviation of the mirror alignment (Japanese Patent Application Laid-Open (KOKAI) No. 2001-076325).

Referring to FIG. 8, a divergent light beam outputted by a light source LD is converted to a moderately focused light beam BEAM, transmitted through a non-polarization beam splitter NBS, and separated into P polarization component and S polarization component by a polarization beam splitter PBS. More specifically, while the P polarization component is transmitted through the PBS and reflected by a reference mirror M2, the S polarization component is reflected by the PBS and reflected by a measurement target surface M1. Then these reflected light beams are combined at the polarization beam splitter PBS and reflected by the non-polarization beam splitter NBS. The light beam reflected by the non-polarization beam splitter NBS goes through a quarter wavelength plate QWP and converted to linearly polarized light, whose polarization orientation rotates in accordance with a variation of a phase difference that bases upon a variation of the path length difference in the separated two light beams. The linear polarized light is divided into four light beams by a division device GBS. Each of the beams is transmitted through four polarization devices PP1, PP2, PP3 and PP4 arranged in a way that each of the polarization orientations is shifted by 45° In this manner, the four light beams are converted to four signal beams, whose interference cycles have 90° phase difference to each other, and received by respective photoreceptive devices PD1 PD2, PD3 and PD4, then four periodic signals are outputted.

In this conventional example, since light is focused on the measurement target, even if an alignment deviation (angle deviation) is generated, the wave surface of the reflected light does not change. Note that the center of the reflected light (optical axis) deviates. Since the wave surface does not change, the interference state between the reflected light and the reference light is stable.

Since this method does not use a cube corner reflector, it can be used as a new compact displacement sensor that measures a microscopic out-of-plane displacement on a measurement-target surface, with the use of a semiconductor laser for an optical sensor head.

However, since this method focuses light on a measurement-target surface, the spatial resolution becomes extremely high. Therefore, if a horizontal deviation or the like occurs on the measurement target object when measuring an out-of-plane displacement of the measurement-target surface, the superficial shape component of the measurement-target object is also detected, and the measurement may become unstable. Therefore, depending on the application, it is better to have a low spatial resolution in the direction of horizontal deviation on the surface for realizing stable out-of-plane displacement measurement. For this reason, widening the light irradiating area on the measurement target (mirror) has been desired.

Furthermore, in the above-described method, measurement is performed by focusing light on the measurement target. However, if there is a large out-of-plane displacement, the light focusing conditions are not satisfied, impairing the function of stabilizing the interference state to deal with an alignment deviation. For this reason, in general the measurable area has been limited to several tens of μm. Therefore, there have been demands for a method that enables easy alignment (enlarged allowance for an angle deviation) and that enlarges the measurable area of an out-of-plane displacement on the order of millimeter.

SUMMARY OF THE INVENTION

The present invention has been proposed in view of the above-described conventional example, and has as its object to provide a position detection apparatus and method adopting a new system, which enlarges a light irradiating area on a measurement-target surface, which enlarges an out-of-plane displacement measurement area, and which does not receive influence of an alignment deviation.

According to the present invention, the foregoing object is attained by providing a position detection apparatus comprising:

a beam splitter arranged to separate an incident parallel beam and to supply separated beams to a reference surface and a measurement target surface respectively;

an incident unit that forms a parallel beam from a light beam of a light source and supplies the parallel beam to the beam splitter so that the separated beams separated by the beam splitter are respectively incident upon the reference surface and the measurement target surface at an angle;

a reflection unit that reflects the separated beams, which have been reflected by the reference surface and the measurement target surface and integrated to a light path by the beam splitter, to be supplied to the beam splitter as a parallel beam along the light path; and generation means that generates a signal corresponding to a phase difference of the separated beams by interfering a returning beam that has been supplied from the reflection unit, separated by the beam splitter, reflected by the reference surface and the measurement target surface, and integrated again to a light path by the beam splitter.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A and 4B are explanatory views of an optical system of a laser interferometer according to the second embodiment;

FIGS. 6A and 6B are explanatory views of an optical system of a laser interferometer according to the fourth embodiment;

DETAILED DESCRIPTION OF THE PREFERRED EMBODIMENTS

Preferred embodiments of the present invention will now be described in detail in accordance with the accompanying drawings.

First Embodiment

Figure 1A:
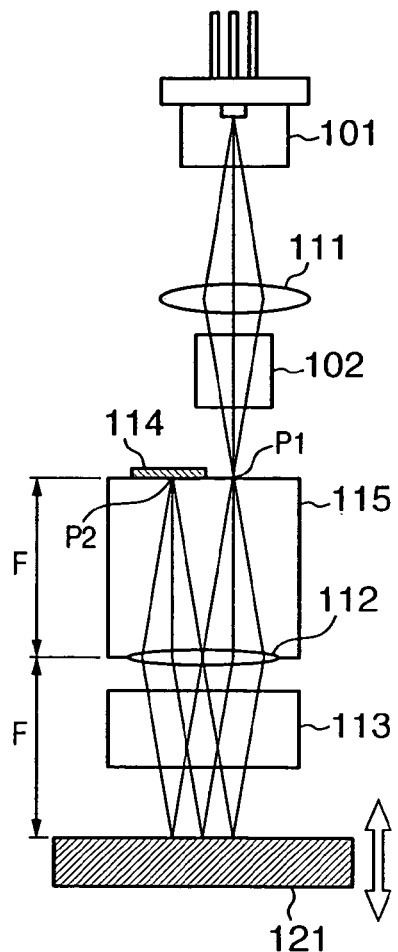
FIGS. 1A and 1B are explanatory views of an optical system of a laser interferometer according to the first embodiment.
Figure 1B:
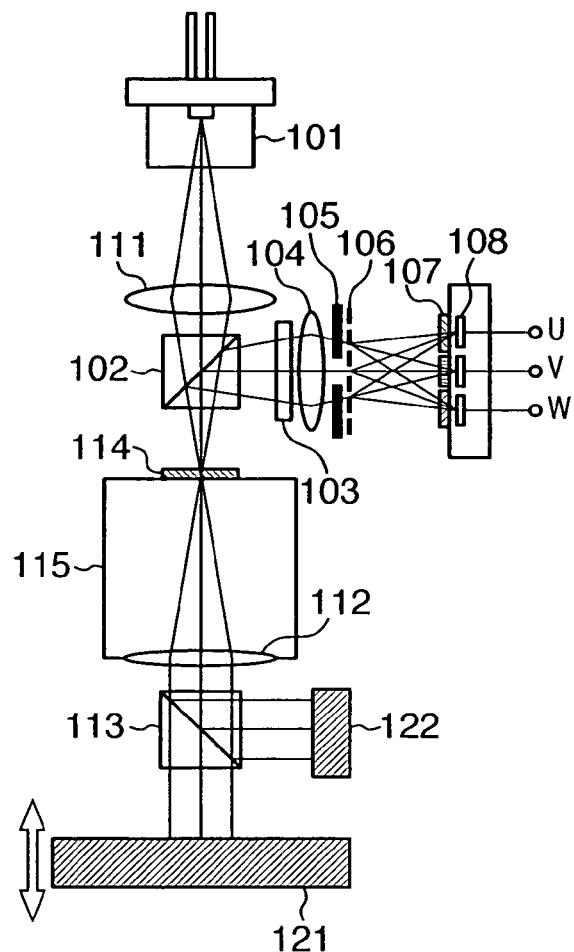

FIGS. 1A and 1B are explanatory views of an optical system of a laser interferometer according to the first embodiment. In FIGS. 1A and 1B, linear polarized light divergent light from a semiconductor laser 101 is focused on a position P1 on a focal plane of a lens 112 by a lens 111. The linear polarized light diverging from the position P1 is incident upon the lens 112, and outputted as a parallel beam having a slightly angled optical axis. Note in this embodiment, "having a slightly angled optical axis" means that the optical axis direction of a parallel beam is set in a way that transmitted light and reflected light of a beam splitter are incident slightly at an angle (e.g., e.g., about 1° to 10°) with respect to the normal direction of the surface of a measurement target object 121 and the surface of a reference mirror 122. The parallel beam exiting from the lens 112 is separated into two light beams, i.e., a reflected beam (S polarized light) and a transmitted beam (P polarized light) (hereinafter comprehensively called the separated beams), by polarization components of a polarization beam splitter 113. While the reflected beam (S polarized light) irradiates a reference mirror 122, the transmitted beam (P polarized light) irradiates a measurement target object (mirror) 121. The reflected light beams of the respective mirrors go through the polarization beam splitter 113, and are focused on the position P2 on the focal plane of the lens 112. Note that the position P2 is slightly shifted from the position P1.

In the neighborhood of the position P2, reflection coating 114 is provided. The light beam focused on the position P2 is returned to the original light path by the reflection coating 114. The light beam reflected by the reflection coating 114 exits from the lens 112 as a parallel beam having a slightly angled optical axis (parallel beam having a direction that is virtually parallel to the optical axis of the parallel beam incident upon the lens 112). Thereafter, the parallel beam is separated into two light beams by the polarization beam splitter 113, irradiating the reflected beam (S polarized light) to the reference mirror 122 and the transmitted beam (P polarized light) to the measurement target object 121. Then, the respective reflected light beams are again incident on the lens 112 as a light beam having the same light path through the polarization beam splitter 113. The beam incident upon the lens 112 is focused on the position P1 on the focal plane, and extracted to the light-source side. In this manner, the S polarized light beam reciprocates twice between the surface of the reference mirror 122 and the beam splitter 113, and the P polarized light beam reciprocates twice between the surface of the measurement target object 121 and the beam splitter 113.

The light beam is extracted on the photoreceptive device side by a non-polarization beam splitter 102. The extracted beam transmits through a quarter wavelength plate 103, thereby being converted to linearly polarized light whose polarization orientation rotates in accordance with a variation of a phase difference, then through a condenser lens 104 and an aperture member 105, it reaches a beam division device 106, where the light beam is divided into three beams. Because the light beam incident upon a photoreceptive device 108 expands, the condenser lens 104 is provided so that the light beam is appropriately condensed and efficiently received by the photoreceptive device 108. The aperture member 105 limits the area of the light beam at the time of dividing the interfering light beam into three beams, so as to assure three homogeneous beams. Without the aperture member 105, divided three beams overlap when the original beam expands. Each of the three beams divided in the foregoing manner is incident upon respective photoreceptors of the tripartition photoreceptive device 108 through a polarization device array 107, in which each polarization axis is shifted by 60°. As a result, detected are three interference signals U, V and W1 whose phases are shifted by 120°, which base upon the out-of-plane displacement of the measurement target object 121.

Since the three interference signals U, V and W are obtained by employing the principle of interference measurement utilizing two reciprocative light paths, they are sine wave signals having a ¼ cycle of the light source wavelength. For instance, assuming that a laser diode having 0.8 µm wavelength is employed, sine wave signals having a cycle of 0.2 µm is obtained. By calculating the wave number, and further, by electrically dividing the signals with a well-known electric phase splitter, it is possible to detect a relative position deviation with a resolution on the order of nanometer.

Alternatively, it may be so constructed that, instead of generating three types of interference signals having a 120° phase difference, four or two types of signals having 90° phase difference may be generated.

Figure 2A:
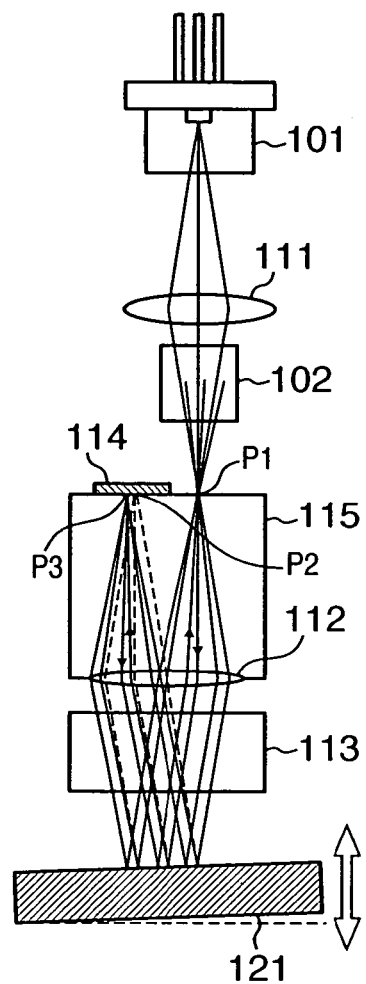
FIGS. 2A and 2B are explanatory views of a light path in a case where the measurement-target surface is slightly tilted in the optical system shown in FIGS. 1A and 1B.
Figure 2B:
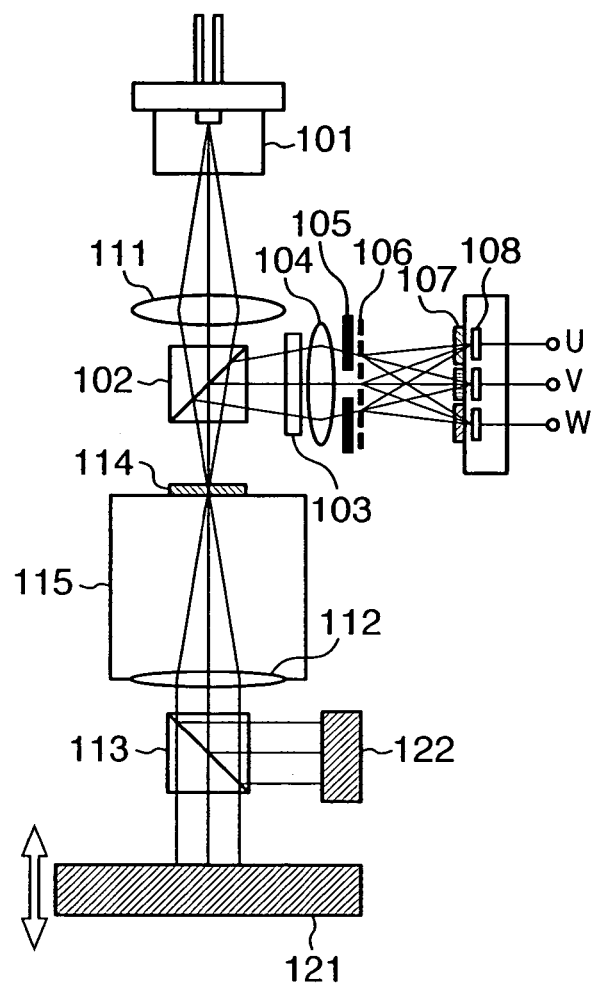

FIGS. 2A and 2B are explanatory views of a light path in a case where the measurement-target surface is slightly tilted in the optical system shown in FIGS. 1A and 1B. Because of the inclination of the measurement target object 121, the reflected beam (P polarized light) from the surface of the measurement target object 121 exits at an angle different from an ideal light path. As a result, the parallel beam incident upon the lens 112 enters a position P3 on the focal plane, which is slightly shifted from the position P2. The beam of the P polarized light incident on the position P3 returns to the original light path by the reflection coating 114 provided in the neighborhood of the positions P2 and P3. In other words, by the effect of reciprocating the beam in the cat's eye optical system consisting of the lens 112 and the reflection coating 114, the light beam is reflected in the same orientation as the normal light path, and outputted as a parallel beam from the lens 112. Among the light beams, the beam of P polarized light is transmitted through the polarization beam splitter 113, and reflected by the measurement target object 121. Therefore, the light beam is again transmitted through the polarization beam splitter 113, and focused on the position P1 on the focal plane of the lens 112, then outputted to the light-source side as divergent light.

Meanwhile, the reflected beam (S polarized light) from the reference mirror 122 follows the ideal light path, and ultimately is focused on the position P1 on the focal plane of the lens 112, then outputted to the light-source side as divergent light. In this manner, the light beam (P polarized light) that has gone through the surface of the measurement target object 121 and the light beam (S polarized light) that has gone through the reference mirror 122 ultimately exit from the focal plane of the lens 112. As described above, by virtue of coinciding the exiting positions, the wave surfaces of the spherical waves of both light beams become uniform, resulting in a stable interference state. This effect also applies to the second to fifth embodiments which will follow.

Although there are two different orientations in inclination of the surface of the measurement target object 121, the only difference is the shifting direction of the focused light reflection position (position P3) on the focal plane of the lens 112. Therefore, basically the same effect can be achieved. As described above, since an interference optical system that is unsusceptible to an inclination of the measurement-target surface can be achieved, it is possible to perform position detection without arranging a cube corner reflector on the measurement target, realizing downsizing and easy manipulation of the optical system.

Figure 3A:
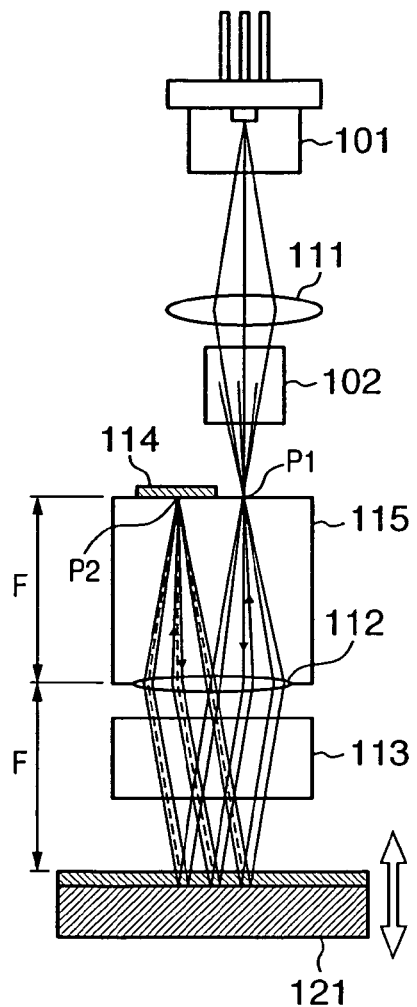
FIGS. 3A and 3B are explanatory views of a light path in a case where the measurement target surface has a parallel out-of-plane displacement on the order of millimeter in the optical system shown in FIGS. 1A and 1B.
Figure 3B:
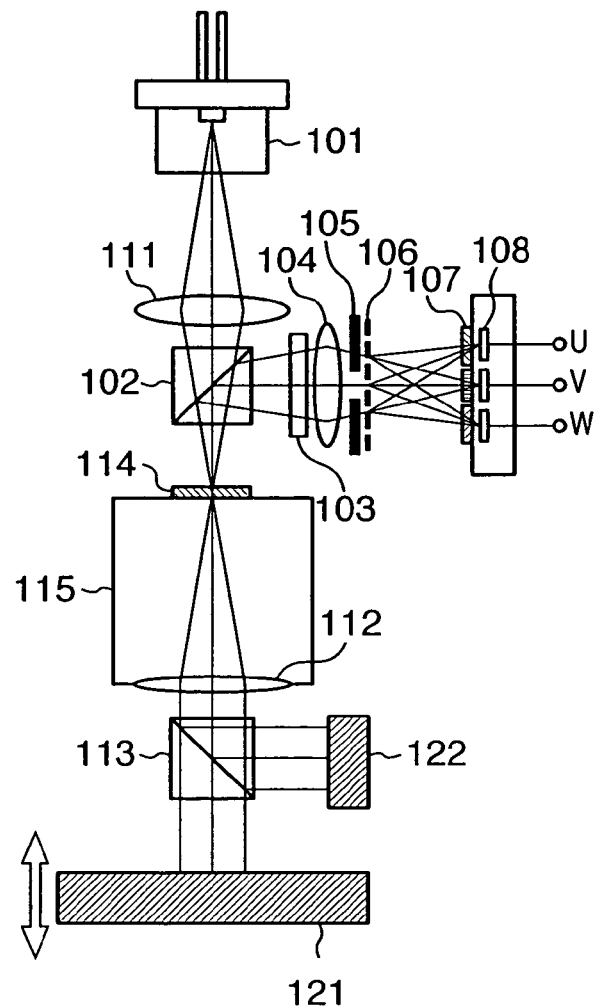

FIGS. 3A and 3B are explanatory views of a light path in a case where the measurement target surface has a parallel out-of-plane displacement on the order of millimeter in the optical system shown in FIGS. 1A and 1B. Since the optical axis center of the reflected light (P polarized light) from the measurement target object 121 is parallelly deviated from the ideal light path, the reflected light beam reaches the position P2 on the focal plane of the lens 112. The position P2 is determined based on the focal distance of the lens and an incident angle of the parallel beam incident upon the lens. In the case of FIGS. 3A and 3B, these values are unchanged. The beam of P polarized light that has reached the position P2 is reflected by the reflection coating 114 provided in the neighborhood of the position P2, and the parallel beam outputted from the lens 112 ends up following the light path that has the same orientation but is parallelly deviated from the original light path. The parallel beam of the P polarized light is transmitted through the polarization beam splitter 113, and reflected by the surface of the measurement target object 121. In this stage, the parallel beam (P polarized light) is reflected in the same orientation as the normal light path, by the effect of reciprocating the beam in the cat's eye optical system consisting of the lens 112 and the reflection coating 114. Therefore, the parallel beam reflected by the measurement target object 121 is transmitted through the polarization beam splitter 111, incident upon the lens 112 and focused on the position P1, then outputted to the light-source side as divergent light. Note that the separated beam, the S polarized light, obtained by the beam splitter 113 follows the ideal light path described in FIGS. 1A and 1B, and is focused on the position P1, then outputted to the light-source side as divergent light. As described above, by virtue of coinciding the exiting positions, the wave surfaces of the spherical waves of both light beams become uniform, resulting in a stable interference state.

Note that since the optical axis of the light beam is deviated in parallel, an eclipse may occur because of the optical effective diameter of the lens 112. Furthermore, when the reflected light interferes with the reference light, the overlapping area of the wave surface becomes small because of the unmatched optical axis. For these reasons, the larger the out-of-plane displacement becomes, the more the signal amplitude which is obtained by receiving the interfering light beams with the photoreceptive device array is reduced. However, for instance, assuming that a light irradiation angle θ of the measurement target surface is 5° and the out-of-plane displacement is 1 mm, the optical axis deviation X is obtained as follows:

$$X = 4 \text{ mm} \times \tan\theta = 0.34 \text{ mm}$$

If the light beam diameter Φ is on the order of millimeter, about 50% overlaps of the interfering light beams are assured. Therefore, even if an out-of-plane displacement on the order of 1 mm is generated, measurement can be performed (note that the above values are a rough standard).

As described above, the first embodiment employs a coherent light source to radiate a parallel beam, having a beam diameter on the order of millimeter, to a measurement target surface slightly at an angle with respect to the normal of the measurement target surface. The reflected beam is received by the cat's eye optical system, then the reflected beam from the cat's eye optical system is again irradiated back to the measurement target surface, and interference between the reflected light and reference light is obtained. Therefore, the embodiment has an advantage in that the measurement area of an out-of-plane displacement can be enlarged on the order of millimeter, and that it is unsusceptible to deviation in the optical alignment.

Second Embodiment

In the first embodiment, the lens 112 and the mirror 114 on the focal plane of the lens are employed to constitute the cat's eye optical system. In the second embodiment, a so-called ¼-pitch gradient index rod lens having reflection coating on its end surface constitutes the cat's eye optical system, thereby achieving the similar effects as the first embodiment.

FIGS. 4A and 4B are explanatory views of an optical system of a laser interferometer according to the second embodiment. Linear polarized light divergent light from the semiconductor laser 101 transmits through a lens 211 and a wedge prism 212 (prism 212 is a device for changing the orientation of the main beam), and is incident upon the position P21 on the end surface of the so-called ¼-pitch gradient index rod lens 213 as a focused beam having a slightly angled optical axis. In a case of employing the gradient index rod lens 213 as a cat's eye device, it is necessary to shift the incident angle of the light beam upon the cat's eye device and to shift the focus position of the light beam from the center as shown in FIGS. 4A and 4B. By virtue of this configuration, the reflection position can be shifted from the incident position, and the exiting light from the gradient index rod lens 213 can be spatially separated from the light incident upon the gradient index rod lens 213. The light beam incident upon the gradient index rod lens 213 is outputted as a parallel beam from the other surface of the lens 213, and separated into two light beams by polarization components of a polarization beam splitter 214. While the reflected beam (S polarized light) obtained by the polarization beam splitter 214 irradiates a reference mirror 222, the transmitted beam (P polarized light) irradiates the surface (mirror) of a measurement target object 221. The respective reflected light beams go through the polarization beam splitter 214, and are focused on the position P22 on the focal plane of the gradient index rod lens 213.

By reflection coating 215 provided in the neighborhood of the position P22, the focused light beam is returned to the original light path, then exits from the gradient index rod lens 213 as a parallel beam, and is separated again into two light beams by the polarization beam splitter 214. Then, the reflected beam (S polarized light) irradiates the reference mirror 222 and the transmitted beam (P polarized light) irradiates the measurement target object 221. The respective reflected light beams are again incident on the gradient index rod lens 213 through the polarization beam splitter 214. As a result, a divergent beam can be extracted from the position P21 on the end surface of the gradient index rod lens 213. In this manner, the S polarized light beam reciprocates twice between the surface of the reference mirror 222 and the polarization beam splitter 214, and the P polarized light beam reciprocates twice between the surface of the measurement target object 221 and the polarization beam splitter 214.

The structure for obtaining interference signals from the light beam diverged from the position P21 is similar to the first embodiment. More specifically, the light beam diverged from the position P21 is extracted on the photoreceptive device side by the non-polarization beam splitter 102. The extracted beam transmits through the quarter wavelength plate 103, thereby being converted to linearly polarized light whose polarization orientation rotates in accordance with a variation of a phase difference. The light beam is divided into three beams by the beam division device 106. Each of the three beams is incident upon respective photoreceptors of the tripartition photoreceptive device 108 through the polarization device array 107, in which each polarization axis is shifted by 60°. As a result, detected are three interference signals, whose phases are shifted by 120°, which base upon the out-of-plane displacement of the measurement target object 221.

As described above, by virtue of employing a gradient index rod lens as a cat's eye optical device, the second embodiment achieves an effect of realizing a small and stable optical system.

Third Embodiment

Figure 5A:
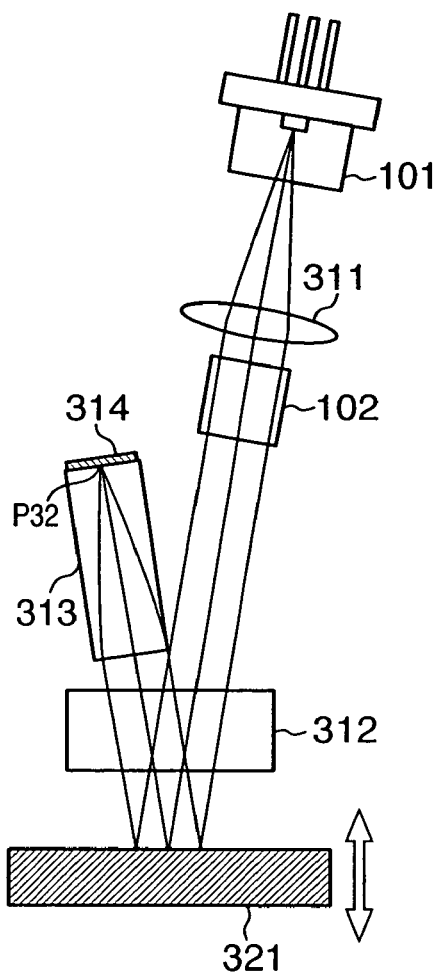
FIGS. 5A and 5B are explanatory views of an optical system of a laser interferometer according to the third embodiment.
Figure 5B:
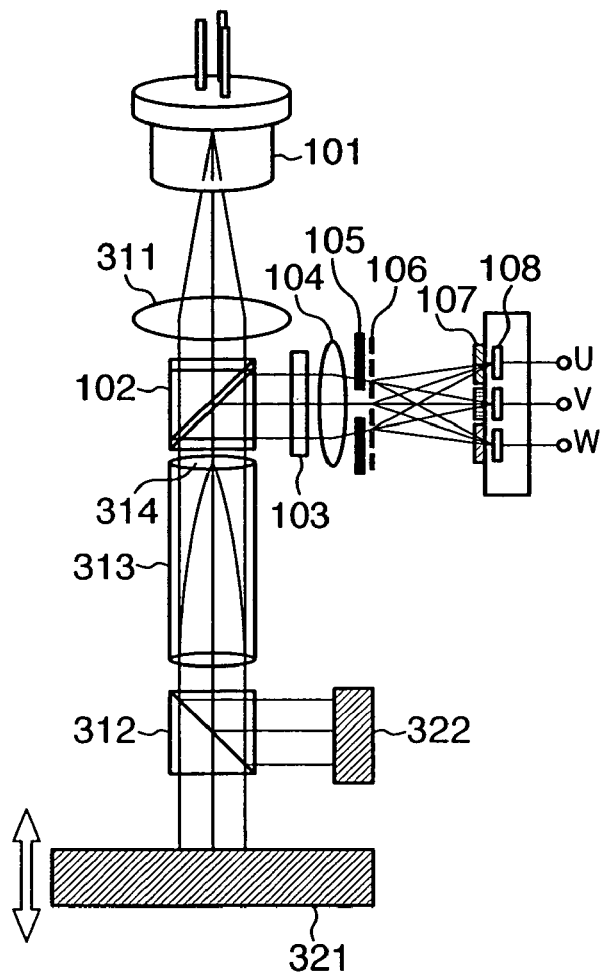

FIGS. 5A and 5B are explanatory views of an optical system of a laser interferometer according to the third embodiment.

As shown in FIGS. 5A and 5B, linear polarized light divergent light from the semiconductor laser 101 transmits through a collimator lens 102, and a parallel beam having a slightly angled optical axis is generated and outputted. The parallel beam is separated into two light beams by polarization components of a polarization beam splitter 312. While the reflected beam (S polarized light) irradiates a reference mirror 322, the transmitted beam (P polarized light) irradiates the surface (mirror) of a measurement target object 321. The respective reflected light beams are incident on a so-called ¼-pitch gradient index rod lens 313 through the polarization beam splitter 312. In the gradient index rod lens 313, the incident light beam is focused on the position P32 on the end surface, and through a reflection coating 314 provided in the neighborhood of the position P32, returned to the original light path. In this manner, the parallel beam exits from the gradient index rod lens 313, and is separated again into two light beams by the polarization beam splitter 312. Then, the reflected beam (S polarized light) irradiates the reference mirror 322 and the transmitted beam (P polarized light) irradiates the surface of the measurement target object 321. The respective reflected light beams are extracted to the light source side through the polarization beam splitter 312. As a result, the separated S polarized light beam reciprocates twice between the surface of the reference mirror 322 and the beam splitter 312, and the separated P polarized light beam reciprocates twice between the surface of the measurement target object 321 and the beam splitter 312.

From the light beam extracted on the light-source side in the above-described manner, interference signals are acquired by the structure similar to that of the first embodiment. More specifically, the light beam is extracted on the photoreceptive device side by the non-polarization beam splitter 102. The extracted beam transmits through the quarter wavelength plate 103, thereby being converted to linearly polarized light whose polarization orientation rotates in accordance with a variation of a phase difference. The light beam is divided into three beams by the beam division device GBS 106. Each of the three beams is incident upon respective photoreceptors of the tripartition photoreceptive device 108 through the polarization device array 107, in which each polarization axis is shifted by 60°. In this manner, detected are three interference signals, whose phases are shifted by 120°, which base upon the out-of-plane displacement of the surface of the measurement target object 321.

Note that the gradient index rod lens 313 and the reflection coating 314 employed in the third embodiment are equivalent to the cat's eye function. They may be substituted by the lens shown in FIGS. 1A and 1B and the reflection coating arranged on the focal plane of the lens.

Fourth Embodiment

FIGS. 6A and 6B are explanatory views of an optical system of a laser interferometer according to the fourth embodiment.

In the fourth embodiment, linear polarized light divergent light from the semiconductor laser 101 is incident upon a polarization preserving optical fiber 402 through a lens 411 in a way that the polarization axis of the optical fiber matches the polarization surface of the light beam. The other end surface of the optical fiber is arranged at the position P41 on the focal plane of a lens 412, for outputting the divergent light. The divergent light is converted to a parallel beam by the lens 412, and outputted as a parallel beam having a slightly angled optical axis. The parallel beam is separated into two light beams having respective polarization components by a polarization beam splitter 413. Among the two light beams, the reflected beam (S polarized light) irradiates a reference mirror 422, and the transmitted beam (P polarized light) irradiates the surface (mirror) of a measurement target object 421.

The respective reflected light beams go through the polarization beam splitter 413, are focused on the position P42 on the focal plane of the lens 412, and returned to the original light path by a reflection coating 414 provided in the neighborhood of the position P42. In this manner, the parallel beam exits again from the lens 412. The parallel beam is separated into two light beams by the polarization beam splitter 413.

The reflected beam (S polarized light) irradiates the reference mirror 422 and the transmitted beam (P polarized light) irradiates the surface (mirror) of the measurement target object 421. The respective reflected light beams are incident upon the lens 412 through the polarization beam splitter 413, and head toward the position P41 on the focal plane of the lens 412. As a result, the S polarized light reciprocates twice between the surface of the reference mirror 422 and the beam splitter 413, and the P polarized light reciprocates twice between the surface of the measurement target object 421 and the beam splitter 413.

The light beam is extracted on the photoreceptive device side by the non-polarization beam splitter 102, which is placed before the position P41 where there is the end surface of the polarization preserving optical fiber 402. Thereafter, interference signals are generated by the structure similar to the first embodiment. More specifically, the extracted beam transmits through the quarter wavelength plate 103, thereby being converted to linearly polarized light whose polarization orientation rotates in accordance with a variation of a phase difference. The beam of linear polarized light is divided into three beams by the beam division device 106. Each of the three beams is incident upon respective photoreceptors of the tripartition photoreceptive device 108 through the polarization device array 107, in which each polarization axis is shifted by 60°. As a result, detected are three interference signals, whose phases are shifted by 120°, which base upon the out-of-plane displacement of the measurement target object surface (surface of the measurement target object 421). By virtue of isolating the light source from the detection head unit using the optical fiber, it is possible to readily downsize the detection head for position detection, and is effective in stabilizing the interference state because the influence of light source heat generation is avoided.

Fifth Embodiment

Figure 7A:
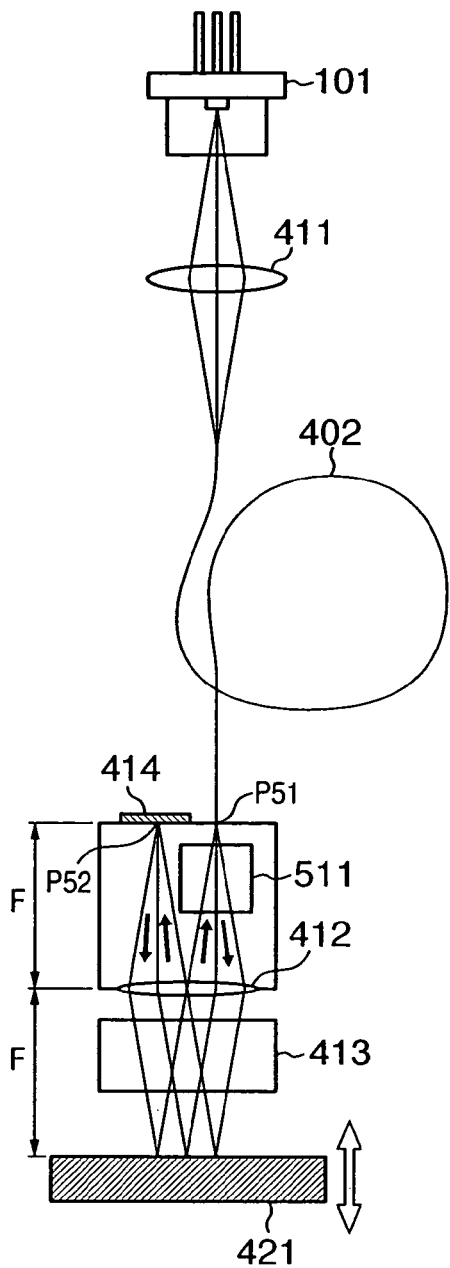
FIGS. 7A and 7B are explanatory views of an optical system of a laser interferometer according to the fifth embodiment.
Figure 7B:
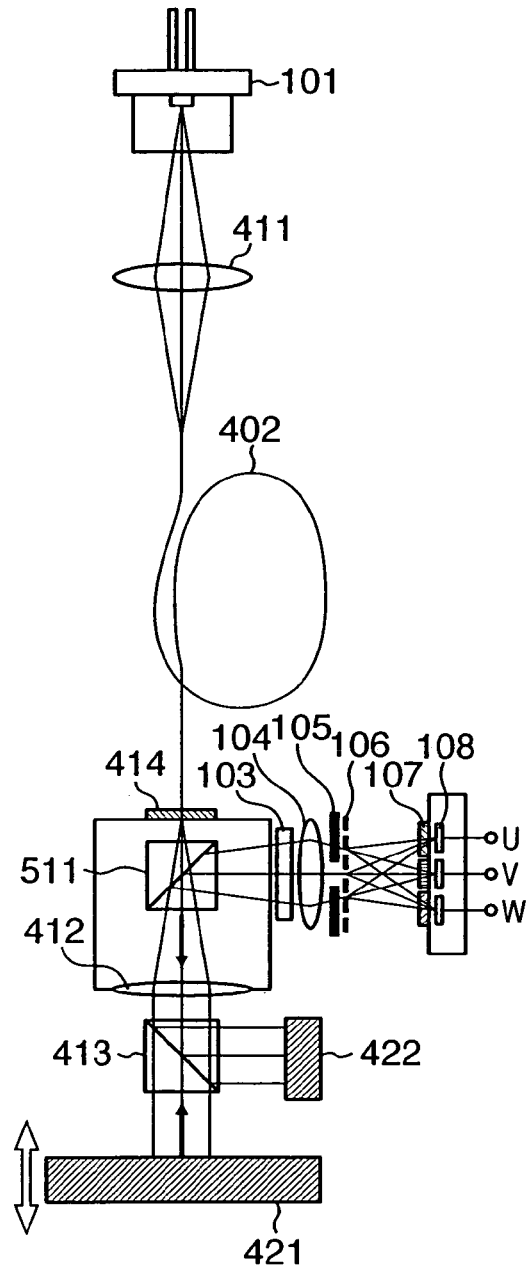
Figure 8:
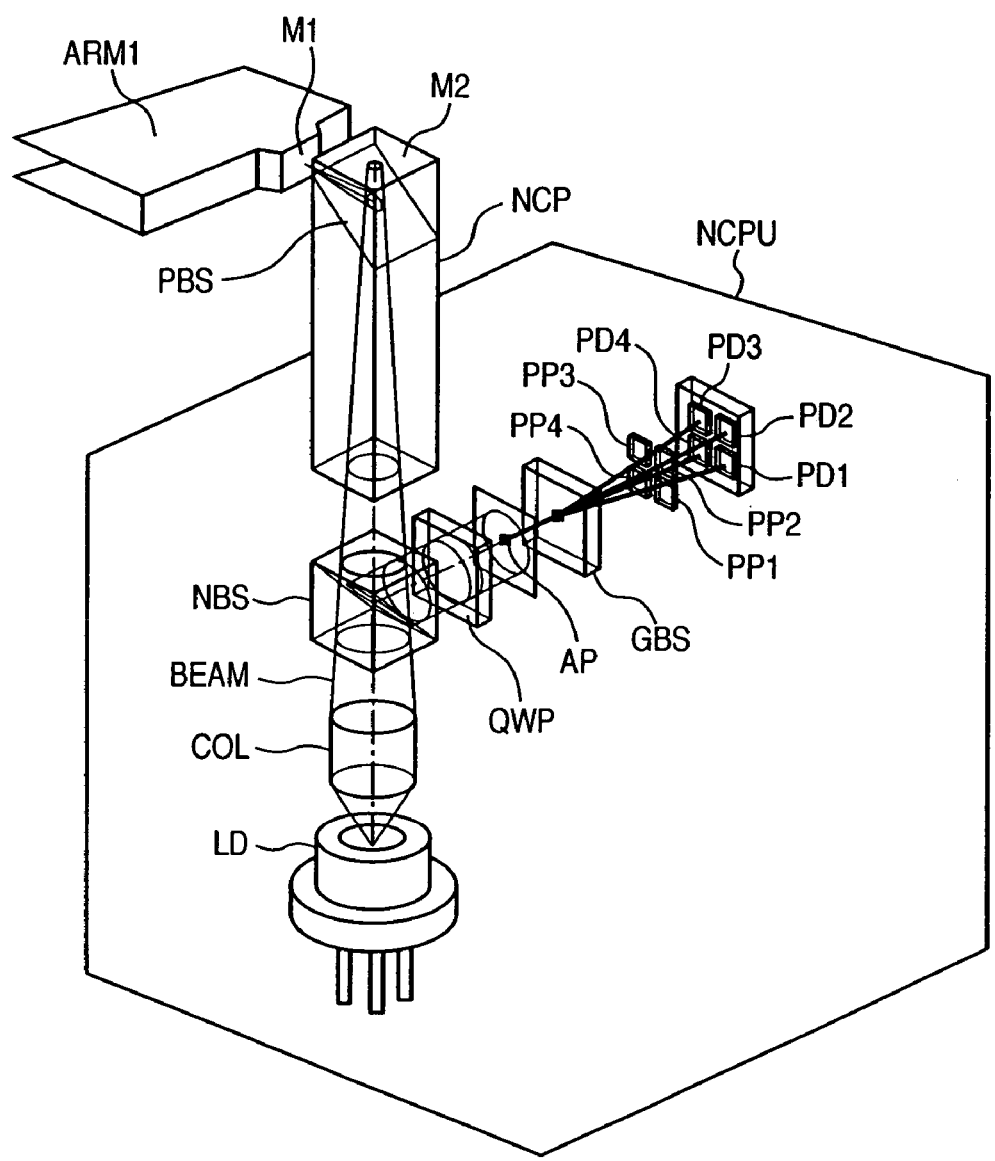
FIG. 8 is an explanatory view of an optical system of a conventional interference measurement method, in which light is focused on a measurement target surface.

FIGS. 7A and 7B are explanatory views of an optical system of a laser interferometer according to the fifth embodiment. By improving the first or fourth embodiment, the fifth embodiment is constructed in a way that the forward light path from the light source side is spatially isolated from the returning light path heading to the photoreceptive device side.

Linear polarized light divergent light from the semiconductor laser 101 is incident upon the polarization preserving optical fiber 402 through the lens 411 in a way that the polarization axis of the optical fiber matches the polarization surface of the light beam. The other end surface of the optical fiber 402 is arranged on the focal plane of the lens 412 slightly at an angle, for outputting the divergent beam. The divergent beam is converted to a parallel beam by the lens 412, and outputted as a parallel beam having a slightly angled optical axis. The parallel beam is separated into two light beams having respective polarization components by the polarization beam splitter 413. The reflected beam (S polarized light) irradiates the surface of the reference mirror 422, and the transmitted beam (P polarized light) irradiates the surface of the measurement target object 421. The respective reflected light beams are incident upon the lens 412 through the polarization beam splitter 413, and focused on the position P52 on the focal plane of the lens 412. The beam focused on the position P52 returns to a light path of a next area by the reflection coating 414 provided in the neighborhood of the position P52, and exits again from the lens 412 as a parallel beam.

The exited parallel beam is separated into two light beams by the polarization beam splitter 413. The reflected beam (S polarized light) irradiates the surface of the reference mirror 422 and the transmitted beam (P polarized light) irradiates the surface (mirror) of the measurement target object 421. The respective reflected light beams are incident upon the lens 412 through the polarization beam splitter 413, focused on the position P51 on the focal plane of the lens 412, and outputted to the optical fiber side. In this manner, the S polarized light beam reciprocates twice between the surface of the reference mirror 422 and the beam splitter 413, and the P polarized light beam reciprocates twice between the surface of the measurement target object 421 and the beam splitter 413.

In the fifth embodiment, the light beam in the returning path is spatially extracted by a partial reflection beam splitter 511, which is placed before the position P51 where there is the end surface of the polarization preserving optical fiber in the forward path. The extracted beam transmits through the quarter wavelength plate 103, thereby being converted to linearly polarized light whose polarization orientation rotates in accordance with a variation of a phase difference. The linearly polarized light is divided into three beams by the beam division device 106. Each of the three beams is incident upon respective photoreceptors of the tripartition photoreceptive device 108 through the polarization device array 107, in which each polarization axis is shifted by 60°. As a result, detected are three interference signals, whose phases are shifted by 120°, which base upon the out-of-plane displacement of the surface of the measurement target object 421. Note that the partial reflection beam splitter 511 may be substituted by a micro-prism.

The measurable area of an out-of-plane displacement is determined only by coherence of a light source in a case of a Michelson interferometer irradiating a parallel beam. For the purpose of downsizing, a surface-emitting laser diode is desirable as a light source (semiconductor laser 101). However, a surface-emitting laser diode may cause a transverse mode variation of returning light, which may generate such phenomenon that the plane of polarization moves. For this reason, a measure for preventing the light returning to the surface-emitting laser diode is necessary. In the fifth embodiment, since the light beam heading toward the light source side can be cut off by the partial reflection beam splitter 511, it is advantageous in terms of the aforementioned aspect. Note in a case of realizing the first to fourth embodiments, it is preferable to provide an isolator or the like for eliminating the returning light.

Note that in each of the above-described embodiments, the non-polarization beam splitter 102 is adopted by the first to fourth embodiments and the partial reflection beam splitter 511 is adopted by the fifth embodiment as a device extracting, to the photoreceptive-device side, interference light beams that have reciprocated twice between the reference mirror and the polarization beam splitter as well as between the measurement target mirror and the polarization beam splitter. However, the partial reference beam splitter 511 may be employed in place of the non-polarization beam splitter 102, or the non-polarization beam splitter 102 may be employed in place of the partial reflection beam splitter 511. Alternatively, a micro-prism may be employed in place of these devices.

According to the above-described embodiments, the following effects can be attained.
(1) Since parallel light irradiation on the order of millimeter is employed, it is unsusceptible to the superficial shape or microscopic scratch on the measurement target surface.
(2) By utilizing parallel light irradiation on the order of millimeter in combination with a light source having an excellent coherence, it is possible to realize a measurement area on the order of millimeter.

(3) Since two-reciprocative path (two-reciprocative interference measurement optical system) employing a cat's eye device is realized, it is possible to achieve a high resolution (sine wave signals having a ¼ cycle of the light source wavelength can be outputted).

(4) By virtue of the two-reciprocative interference measurement optical system employing a cat's eye device, it is possible to realize stable measurement even if there is an alignment deviation on the measurement target surface.

(5) According to the fifth embodiment in particular, since the forward light path is spatially isolated from the returning light path, it is possible to eliminate the light returning to the light source; thus, more stable measurement is possible without utilizing an isolator or the like.

(6) By virtue of eliminating the use of a cube corner reflector arranged on a measurement target portion and an internal cube corner reflector for a reference beam (first to fifth embodiments), and also by commonly utilizing the cat's eye lens and the collimator lens (third embodiment), it is possible to realize a downsized optical system.

(7) By virtue of reducing the portion exposed to the air, stable measurement can be realized (the portion exposed to the air is a light path from the polarization beam splitter to the measurement target surface, where the light beam passes in the air. When the air in this portion vibrates, a fluctuation is caused in the interference signals. Therefore, the shorter the exposed portion, the more stable the measurement.)

According to the present invention, it is possible to provide a position detection apparatus and method adopting a new system, which enlarges a light irradiating area on a measurement-target surface, which enlarges an out-of-plane displacement measurement area, and which does not receive influence of an alignment deviation.

The present invention is not limited to the above embodiment and various changes and modifications can be made within the spirit and scope of the present invention. Therefore, to apprise the public of the scope of the present invention, the following claims are made.

CLAIM OF PRIORITY

This application claims priority from Japanese Patent Application No. 2004-302063 filed on Oct. 15, 2004, which is hereby incorporated by reference herein.

What is claimed is:

1. A position detection apparatus comprising:
a beam splitter arranged to separate an incident beam into a first beam and a second beam and to supply the first and second beams to a reference surface and a measurement target surface respectively;
an optical unit arranged to lead a beam from a light source to said beam splitter so that the first and second beams obtained by said beam splitter are respectively incident upon the reference surface and the measurement target surface at an angle, and to lead the first and second beams which have been integrated by said beam splitter after being reflected at the reference surface and the measurement target surface respectively, to a reflecting member; and
a light receiving element arranged to receive the first and second beams and generate an interference signal,
wherein the first and second beams reflected at said reflecting member are led to said beam splitter by said optical unit, separated again by said beam splitter, reflected at the reference surface and the measurement target surface respectively, and integrated again by said beam splitter, said optical unit leads the first and second beams which have been integrated again by said beam splitter to said light receiving unit,
said light receiving element receives the first and second beams from said optical unit and generates the interference signal corresponding to a phase difference of the first and second beams, and
said optical unit focuses the first and second beams which have been integrated by said beam splitter at the position of said reflecting member.

2. A position detection apparatus comprising:
a beam splitter arranged to separate an incident beam into a first beam and a second beam and to supply the first and second beams to a reference surface and a measurement target surface respectively;
an optical unit arranged to lead a beam from a light source to said beam splitter so that the first and second beams obtained by said beam splitter are respectively incident upon the reference surface and the measurement target surface at an angle, and to lead the first and second beams which have been integrated by said beam splitter after being reflected at the reference surface and the measurement target surface respectively, to a reflecting member; and
a light receiving element arranged to receive the first and second beams and generate an interference signal,
wherein the first and second beams reflected at said reflecting member are led to said beam splitter by said optical unit, separated again by said beam splitter, reflected at the reference surface and the measurement target surface respectively, and integrated again by said beam splitter,
said optical unit leads the first and second beam which have been integrated again by said beam splitter to said light receiving unit,
said light receiving element receives the first and second beams from said optical unit and generates the interference signal corresponding to a phase difference of the first and second beams,
said optical unit comprises an optical element which has its focal plane at the position of said reflecting member, and
said optical element leads the first and second beams which have been integrated by said beam splitter to said reflecting member, and leads the first and second beams which have been reflected at said reflecting member to said beam splitter.

3. The apparatus according to claim 2, wherein said optical element converts a beam from the light source into a parallel beam, leads the parallel beam to said beam splitter, and leads the first and second beams which have been integrated again by said beam splitter to said light receiving element.

4. The apparatus according to claim 2, wherein said optical element comprises a lens.

5. The apparatus according to claim 4, wherein the lens is a gradient index lens.

6. The apparatus according to claim 3, wherein said optical unit comprises a focusing part which focuses a beam from the light source on a first position, and
said optical element is located so as to have its focal plane at the first position, and converts a beam diverged from the first position into the parallel beam.

7. The apparatus according to claim 6, wherein said focusing part includes an optical fiber which propagates the light beam from the light source and which has an output end at the first position.

8. The apparatus according to claim 1, wherein said optical unit comprises: a first lens which converts a beam from the light source into a parallel beam; and a second lens which has its focal plane at said reflecting member, the first lens leads the parallel beam to said beam splitter and leads the first and second beams which have been integrated again by said beam splitter and interfere with each other, the second lens leads the first and second beams which have been integrated by said beam splitter to said reflecting member and leads the first and second beams which have been reflected by said reflecting member to said beam splitter.

9. The apparatus according to claim 1, further comprising:

a quarter wavelength plate arranged between the optical unit and the light receiving element, which transmits a beam from the optical unit;

a beam division device arranged between said quarter wavelength plate and said light receiving element, which divides the beam from said quarter wavelength plate into a plurality of beams; and a polarization device array arranged between said beam division device and said light receiving element, wherein said light receiving element comprises a partition light receiving element array which receives the plurality of beams through said polarization device array.

10. A position detection method employing a beam splitter arranged to separate an incident beam into a first beam and a second beam and to supply the first and second beams to a reference surface and a measurement target surface respectively, the method comprising the steps of:

leading, by an optical unit, a beam from a light source to the beam splitter so that the first and second beams obtained by the beam splitter are respectively incident upon the reference surface and the measurement target surface at an angle;

leading, by the optical unit, the first and second beams which have been integrated by the beam splitter after being reflected at the reference surface and the measurement target surface respectively, to a reflecting member, wherein the first and second beams which have been integrated by said beam splitter are focused by said optical unit at the position of said reflecting member;

leading, by the optical unit, the first and second beams reflected at the reflecting member to the beam splitter, wherein the first and second beams are separated again by the beam splitter, reflected at the reference surface and the measurement target surface respectively, and integrated again by the beam splitter;

leading, by the optical unit, the first and second beams which have been integrated again by the beam splitter to a light receiving unit which receives the first and second beams; and generating, by the light receiving unit, an interference signal corresponding to a phase difference of the first and second beams.

11. A position detection method employing a beam splitter arranged to separate an incident beam into a first beam and a second beam and to supply the first and second beams to a reference surface and a measurement target surface respectively, the method comprising the steps of:

leading, by an optical unit, a beam from a light source to the beam splitter so that the first and second beams obtained by the beam splitter are respectively incident upon the reference surface and the measurement target surface at an angle;

leading, by an optical element in the optical unit, the first and second beams which have been integrated by the beam splitter after being reflected at the reference surface and the measurement target surface respectively, to a reflecting member which is positioned at a focal plane of the optical element;

leading, by the optical element, the first and second beams reflected at the reflecting member to the beam splitter, wherein the first and second beams are separated again by the beam splitter, reflected at the reference surface and the measurement target surface respectively, and integrated again by the beam splitter;

leading, by the optical unit, the first and second beams which have been integrated again by the beam splitter to a light receiving unit which receives the first and second beams; and generating, by the light receiving unit, an interference signal corresponding to a phase difference of the first and second beams.

* * * * *